May 14, 1929.    D. G. RICE    1,713,241
COMMERCIAL AND ADMISSION TICKET
Filed May 18, 1927    2 Sheets-Sheet 1
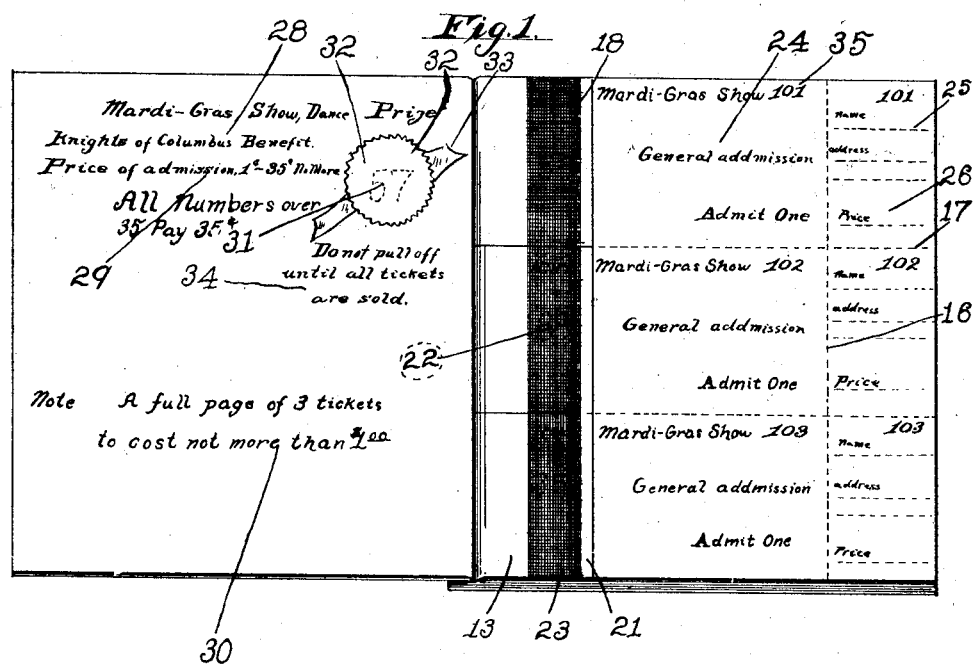
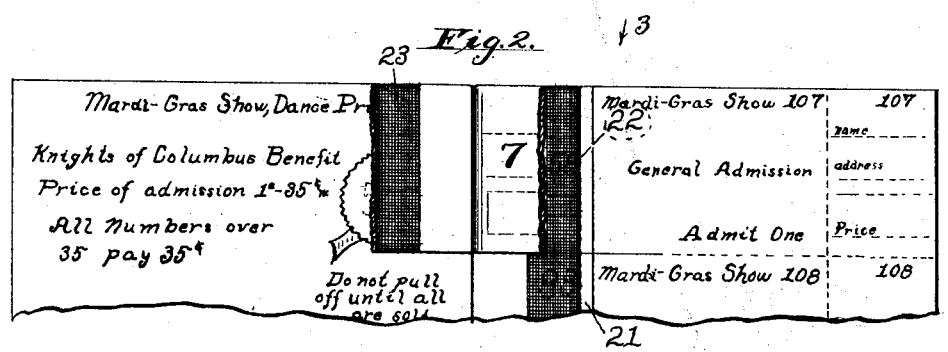
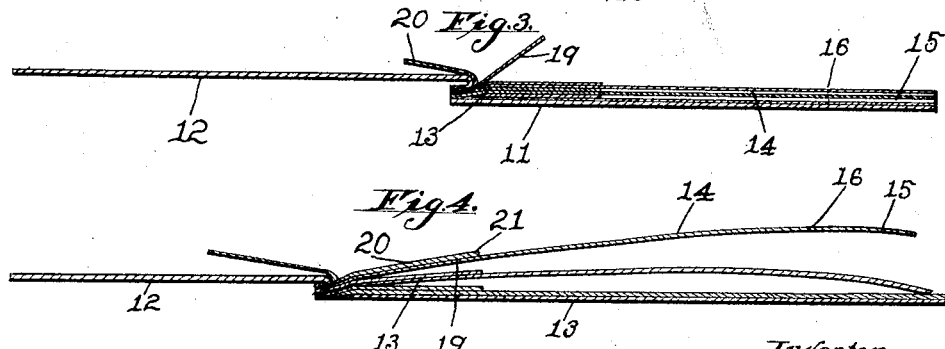

May 14, 1929. D. G. RICE 1,713,241
COMMERCIAL AND ADMISSION TICKET
Filed May 18, 1927  2 Sheets-Sheet 2
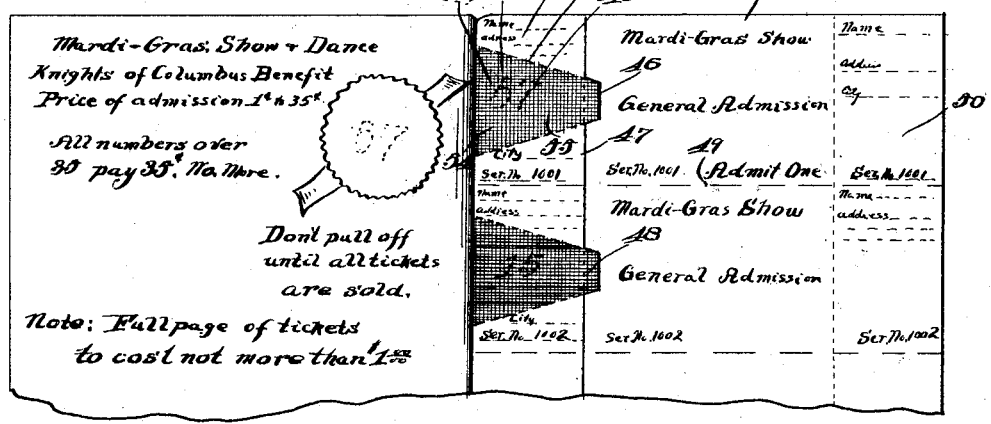
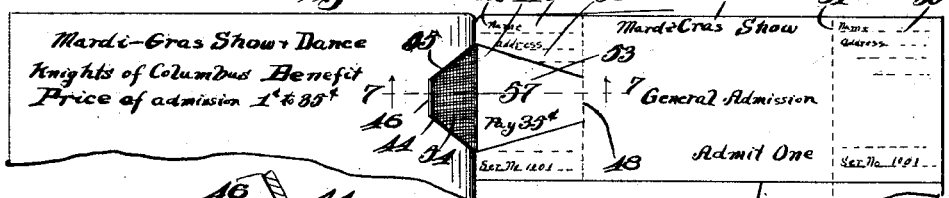
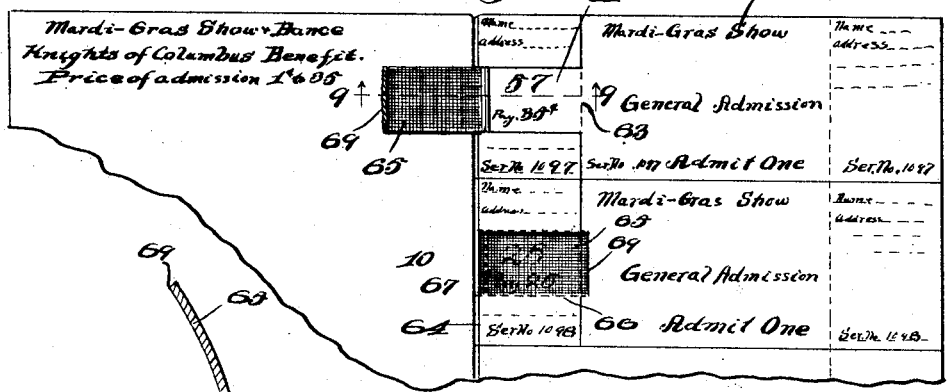
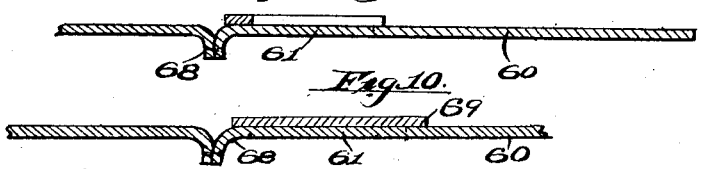
Inventor
D. G. Rice
by Hazard and Miller
Attorneys Patented May 14, 1929.

1,713,241

UNITED STATES PATENT OFFICE.

DAVID G. RICE, OF ALTADENA, CALIFORNIA.

COMMERCIAL AND ADMISSION TICKET.

Application filed May 18, 1927. Serial No. 192,292.

My invention is a commercial and admission ticket having the element of chance in relation to the price, or some other characteristic of the sale and purchase of the ticket or holding thereof, and the factor having to do with the element of chance being obscured so that in the sale and purchase of the ticket the seller and purchaser are not aware of such factor.

My present invention may be considered as an improvement on the admission ticket of my application Serial No. 170,662 filed February 24, 1927. In the ticket of the above mentioned application I utilize numbers on the different tickets which indicate the sale and purchase price and also one or more of the numbers entitling the purchaser to a prize. Such numbers were, however, obscured by seals or the like so that neither the seller nor purchaser was aware of the number on the individual ticket, but when the ticket was sold the seal could be torn off and thus expose the number and hence show the price the purchaser had to pay. As a collateral element I had a number on a sheet with a seal thereover, which seal was torn off the sheet after a complete set of tickets, such as a book, had been sold and the purchaser of a ticket having the same number was entitled to a prize. On account of the expense in the cost of the seals and the pasting of such seals on the ticket, I have devised a simpler construction in the present ticket. These tickets may be utilized for a variety of purposes other than for mere admission and were termed admission tickets as such is the present general use of same.

An object of the present invention is the construction of a ticket or a book of tickets in which the ticket is provided with a stub, the ticket being readily severed from the stub, and in such severing the stub may be opened out forming a plurality of sheets and on one of such sheets there is a number which, before removing of the ticket, is obscured so that neither the seller or purchaser is aware of such number. These numbers may have to do with various features in relation to the ticket and for instance may designate the selling price of the ticket or, in addition to indicating the selling price, one or more of the numbers may entitle the purchaser to a prize or bonus of some character and in order that neither the seller or purchaser will be aware of the prize winner until all the tickets have been sold I preferably on a separate sheet have a number which is covered by a readily removable seal, the seal to be left intact until all the tickets are sold.

In constructing my ticket I have the ticket proper of a single sheet of paper or cardboard and a stub formed of two thicknesses of paper or cardboard. In practice the ticket and the lower sheet are formed integral and an upper sheet is pasted over part of the ticket and part of the stub so that a number marked on the under sheet is obscured. I provide perforations or the like for ready severing the ticket and stub and in such severing operation the paste is cut through or the perforations are on one side of the paste so that the stub may be opened up exposing two sheets, the lower sheet with the number thereon and the upper sheet forming a cover. In order to more thoroughly obscure the number when thin paper is used as a cover for the stubs I darken or blacken the under surface of the covering paper so that the number cannot be seen through such paper. If desired, the tickets may be made up into books having separate sheets and each sheet having a plurality of tickets with their separate stubs. There may also be an additional stub on the ticket of the ordinary character which may be held by the purchaser and on which he marks his name and address, if desired, and the number on the stub.

My invention is illustrated in the accompanying drawings, in which:

Figure 1 is a plan of a ticket book showing the construction with the tickets bound in the form of a book.

Figure 2 is a plan of part of the book, with the ticket torn off one of the stubs and such stub opened up to illustrate the main or back sheet of the stub and the cover sheet.

Figure 3 is a longitudinal sectional view of the book, as if taken in the direction of the arrow 3 of Fig. 2.

Figure 4 represents a longitudinal section of a book of tickets showing the tickets and the stubs with their cover sheets exaggerated in thickness to indicate the construction.

Figures 5 and 6 are face views of alternative constructions, Fig. 6 showing one of the halves open.

Figure 7 is a section on the line 7—7 of Fig. 6.

Figure 8 is a face view of another form of my invention.

Figures 9 and 10 are sections on the lines 9—9 and 10—10 respectively of Fig. 8.

In the construction of my ticket in the form of a book I preferably utilize a rather heavy back cover leaf 11 and a front cover leaf 12 with a series of stubs 13 with tickets 14 secured to the stubs and with auxiliary or additional stubs 15 on the ends of the tickets, these elements all being bound together forming a small book or pamphlet type of article.

Each of the tickets with its stub is constructed as shown particularly in Fig. 4. There is a line of perforations or the like 16 for severing the auxiliary stub from the main portion of the ticket 14, and a line of horizontal perforations or the like 17 to sever one ticket from another, the auxiliary stubs from the next auxiliary stubs, and the main stubs 13 from each other. There are also perforations or the like 18 to sever the ticket portion with its auxiliary stub from the main stub 13.

The main stubs are constructed with an under sheet or back leaf 19 and a cover leaf 20, these being glued or cemented together on a narrow portion 21 which is on the ticket side of the perforations 18. Thus it will be seen that when the ticket part 14 is torn from the stub part 13 the back or under leaf 19 forms a distinct element and the cover leaf 20 may be readily separated therefrom and opened, as shown clearly in Figs. 2 and 3.

Numerals or other indicia 22 are marked on the back or under leaf of the stub, preferably adjacent the edge next the perforations 18, and before the ticket part is torn off the stub such numbers are obscured by the cover leaf. In order that such cover leaf may be made of thin paper and still obscure the number, I preferably darken or blacken a portion 23 of the cover leaf, this preferably being on the under side thereof which is next the back sheet of the stub when these are folded together and the ticket secured to same. It will be seen by this construction that the ticket 14, the under leaf 19 of the stub, and the auxiliary stub 15, may be made of relatively heavy cardboard and that the cover leaf 20 may be of thin paper.

On these tickets I preferably have certain indicia 24 which will indicate the character of the entertainment or other features for which the ticket is issued, and on the auxiliary ticket I have spacing and marking for the name of the purchaser with his address, as indicated at 25, with a line 26 on which the price may be marked. Also on the stub there is a place 27 for the name and address of the purchaser, the price being indicated by the number 22. The name of the purchaser may thus be written after selling of the ticket and opening up of the stub on the under leaf or the cover leaf of such stub.

On the inside of the front cover leaf or of a fly leaf of the book I preferably have printed matter 28 which indicates the character of the entertainment or purpose for which the ticket is issued, and I may have additional information 29 showing that the price of the tickets is limited, although the numbers may run considerably above such price. It will be noted that I have marked the price of tickets in this instance as from one (1) to thirty-five (35) cents and no more and that all numbers over 35 pay 35 cents. As a special inducement to purchase a sheet of tickets I have other printed matter 30 which indicates that the purchaser of a full sheet of tickets may secure same for not more than one (1) dollar. It is to be understood that the numbers 22 on the stubs will be placed thereon indiscriminately so that a purchaser no matter from which page he purchases his tickets will have a chance for securing one or more tickets at less than the maximum price.

In order to ascertain the prize winner a number 31 is printed on the inside of the cover or on the fly leaf or other sheet and over this is secured a seal 32 which is readily removable by having a strip of ribbon 33 pasted thereover. There is also the statement 34 indicating that this seal is not to be pulled off until all the tickets are sold. This number 31 corresponds to one of the numbers 22 on one of the main stubs. It is to be understood, if desired, that the tickets may each have a serial number printed on same, this serial number being incorporated on the main stubs and auxiliary stubs if desired and such serial number 35 may have reference to any purpose for which serial numbers are marked on tickets.

The manner of using my ticket or ticket book is substantially as follows:

An immediate use of these tickets, either in a separate or book form, is for organizations who are putting on entertainments of different character, but they may be utilized for very many commercial purposes. It will be seen that the vendor and purchaser of a ticket or of a sheet of tickets is unaware of the purchase price as this is obscured by the two sheet main stub, however, the purchaser is assured, if desired, by the statement on the book that he will not have to pay over a maximum price for any individual ticket or over a maximum price for a sheet of tickets. On selling the ticket the vendor tears the ticket with the auxiliary stub from the main stub, severing this on the line of perforations 18, and such severance leaves the strip with the glue 21 on the ticket and the stub may then be opened, the cover leaf 20 being separated from the under leaf 19, thereby allowing reading of the number on such main stub. If desired, the purchaser's name and address may then be written at the place indicated by the numeral 27 on one of the sheets of the main stub and, if desired, the purchaser may also write his name and address at the place indicated by 25 on the auxiliary stub and mark the price at the place 26 on such auxiliary stub. This is done by the purchaser in case the prize is not given immediately and he is required to give up the ticket 24 for admission to the entertainment or other function. Then after the full book of tickets has been sold the vendor tears off the seal 32, utilizing if desired the ribbon 33 and exposes the number 31, giving a prize, bonus or the like to the purchaser holding the ticket having such number on the auxiliary stub, the vendor having the name and address of such purchaser on his main stub to locate such party.

It is to be understood that the ticket and the manner of making the book of tickets may be considerably modified to adapt the construction for different purposes and instead of having numbers obscured on the main stub there may be some written or printed matter which entitles the purchaser of the ticket to some benefit in addition to that derived from holding the ticket.

In Figs. 5, 6 and 7, I show an alternative construction of my ticket book. In this case the ticket 40 and the under leaf 41 are formed integral and are folded over at the folded part 42 and have a cover leaf portion 43. This cover leaf is provided with a separable cover strip 44, there being lines of perforations 45 to allow ready separation of the cover strip from the cover leaf. This cover strip has a tab 46 which extends beyond the edge 47 of the cover leaf. The vertical line of perforations for separating the ticket proper from the stub is on the line 48 and the horizontal line of perforations for separating one ticket from another is on the line 49. I also illustrate separate stubs 50, separable from the ticket proper on the line 51.

The name and address of the purchaser of the ticket is made on the cover leaf of the stub, as indicated by the numeral 52. The price and prize number 53 is below the separable cover strip. This cover strip is preferably darkened on the upper surface 54 and on the under surface 55 and if the ticket and the under leaf thereof are made of thin material the part underneath the prize number 53 may also be darkened, as indicated by the numeral 56.

Figure 7 illustrates the fly leaf 57 and only one ticket secured by the binding 58 but it is to be understood that a number of tickets or sheets of tickets may be bound together. The glue for securing the cover leaves to the under leaf portion 41 of the stub is so placed that it does not glue the cover strip 44. In using this type of book or ticket, the vendor may readily grasp the tab 46 and turn back the cover strip 44 which tears on the perforated lines 45 and may be folded backwardly against the cover leaf, as indicated in Fig. 6.

In the construction of the ticket or book of tickets, as illustrated in Fig. 8, the ticket proper is designated by the numeral 60, in which the under leaf part of the stub is indicated by the numeral 61 and the cover leaf by the numeral 62. This cover leaf comprises a strip of paper which is pasted over the under part 61 of the stub, one edge of the paper and the perforation line 63 registering, the edge towards the binding being indicated by the numeral 64. A cover strip 65 has horizontal perforation lines 66 with a perforation line 67 adjacent the binding portion 68 of the book and a tab 69 extends beyond the perforation line slightly over the ticket proper. The price and prize number is printed on the underneath part of the stub, to be covered by the cover strip part, and the name and address of the purchaser as well as the serial number of the ticket may be printed on the top of the cover leaf part. In this instance also the cover strip may be darkened on the face and the back and if the paper of the ticket and the under leaf part of the stub 61 is thin, this also may be darkened on the back.

In utilizing the ticket and ticket holder of Figs. 8, 9 and 10, the vendor may grasp the tab part 69, which is not pasted to the ticket, and on pulling this the whole cover strip part is separated, being torn on the perforation lines 66 and 67. This separated cover strip and the tab are indicated completely severed in Fig. 9.

It is to be understood that the ticket and book of tickets as shown in Figs. 5 through 10 may be utilized in the same manner and for the same purposes as the ticket or book of tickets as illustrated in the construction of Figs. 1 through 4.

From the above description, together with the drawings, it will be seen that I have developed a type of admission ticket or book of tickets which is useful for carnivals, festivals, or the like, and is of such a character that it readily appeals to organizers of entertainments for various benevolent organizations or clubs, or societies, in which the element of having the price more or less indefinite appeals to the purchasers, as does also the prospect of possibly obtaining a prize. My type of ticket, however, is of advantage and may be utilized by commercial companies and organizations such as circuses and amusement parks having various concessions.

The advantage of having the tab 46 of Figs. 5, 6 and 7 and the tab 69 of Figs. 8, 9 and 10 to extend beyond the line of the perforation joining the ticket and the stub, is that when the ticket is removed the tab is readily grasped by the finger and thus the tab and the cover leaf may be raised to expose the numeral. While the tab could probably be grasped without removing the ticket from the stub, this necessitates raising the tab with the finger nail or with some implement, as it is usually held close to the ticket.

Various changes may be made in the principles of my invention without departing from the spirit thereof, as set forth in the description, drawings and claims.

I claim:

1. In the art described, the combination of a ticket and a stub secured together on a severable line, the stub having an under leaf and a cover leaf partly secured together, the cover leaf having a section forming a cover strip with severable lines, said cover strip being adapted to obscure indicia on the under leaf of the stub, the severance lines of the strip and the cover leaf allowing lifting of the cover leaf after severance of the ticket from the stub.

2. In the art described, the combination of a ticket and a stub secured together on a severable line, the stub having an under leaf and a cover leaf partly secured together by glue, the said cover leaf having a section forming a cover strip with severable lines, the cover strip being adapted to obscure indicia on the stub, the cover strip having a free end extending over the ticket and leaving a tab free of the ticket whereby upon the severing the ticket from the stub, the said cover strip may be lifted by engaging the tab and torn from the cover leaf on the severable lines.

3. A ticket device comprising a sheet having a body portion and a stub joined thereto, an extension of the stub being folded partially thereover to form a cover, the cover being attached to the portion of the sheet underlying same and having an area thereof free of attachment, said area being partially bounded by perforations in the cover sheet, whereby that portion of the cover sheet embracing said area may be separated from the corresponding area of the underlying sheet to expose the latter area.

4. In the art described, the combination of a ticket connected to a stub, said stub being formed of an under leaf and a cover leaf secured together, with indicia marked on the under leaf and obscured by the cover leaf, a severance line for severing the ticket from the stub whereby in severing the ticket from the stub the cover leaf may be opened from the under leaf allowing inspection of the indicia.

5. In the art described, a ticket having a stub, the stub having an under leaf portion and a cover leaf portion secured partially together by glue, a cover strip in the cover leaf portion connected thereto along a line of perforations to allow severance, indicia on the under leaf portion of the stub below the cover strip, the said cover strip being free from the cover leaf at one margin to allow tearing of same at the perforations to expose the said indicia.

6. In the art described, the combination of a ticket and a stub joined together along a perforated line, the stub having an under leaf and a cover leaf part partially secured together by glue, the cover leaf of the stub having a cover strip part separated therefrom by perforated lines, indicia on the under leaf of the stub under the said cover strip, and a tab projecting from the end of the cover strip, said tab being free of glue to allow gripping and tearing of said cover strip on the perforated lines to expose the indicia.

7. In the art described, the combination of a ticket having a stub secured thereto on a perforated line, the stub having an under leaf and a cover leaf partly secured together by glue, the cover leaf having a section forming a cover strip with perforated joining lines with the cover strip, indicia on the under leaf of the stub under the said cover strip, the cover strip being free of glue, a tab extending from one end of the cover strip free of glue, the cover strip being tearable on the perforated lines by grasping the tab to entirely sever said portion of the cover strip from the cover leaf part of the stub and to expose the indicia thereunder.

In testimony whereof I have signed my name to this specification.

DAVID G. RICE.